United States Patent
Liu

(10) Patent No.: US 10,323,790 B2
(45) Date of Patent: Jun. 18, 2019

(54) ROTARY SUCTION CUP

(71) Applicant: Guangzhou Homfel Ltd., Guangzhou (CN)

(72) Inventor: Martin Liu, Guangzhou (CN)

(73) Assignee: Guangzhou Homfel, Ltd (CN)

( * ) Notice: Subject to any disclaimer, the term of this patent is extended or adjusted under 35 U.S.C. 154(b) by 0 days.

(21) Appl. No.: 15/913,339

(22) Filed: Mar. 6, 2018

(65) Prior Publication Data

US 2018/0363844 A1    Dec. 20, 2018

(30) Foreign Application Priority Data

Jun. 19, 2017    (CN) .................... 2017 2 0717854 U

(51) Int. Cl.
*F16M 13/02*    (2006.01)

(52) U.S. Cl.
CPC ....... *F16M 13/022* (2013.01); *F16M 2200/08* (2013.01)

(58) Field of Classification Search
CPC .................... F16M 13/022; F16M 2200/08
USPC ...... 248/467, 683, 537, 205.5, 205.8, 206.2, 248/206.3, 309.3, 362, 363
See application file for complete search history.

(56) References Cited

U.S. PATENT DOCUMENTS

| | | | | |
|---|---|---|---|---|
| 6,932,306 | B2 * | 8/2005 | Zou ..................... | F16B 45/00 |
| | | | | 248/205.5 |
| 7,475,860 | B2 * | 1/2009 | Chien .................. | F16B 47/00 |
| | | | | 248/363 |
| 7,708,245 | B2 * | 5/2010 | Woo .................... | G09F 7/12 |
| | | | | 248/205.7 |
| 2004/0124325 | A1 * | 7/2004 | Kwok ................. | F16B 47/006 |
| | | | | 248/205.8 |
| 2006/0027720 | A1 * | 2/2006 | Wu ...................... | F16B 47/00 |
| | | | | 248/205.5 |
| 2010/0252700 | A1 * | 10/2010 | Wang .................. | F16B 47/00 |
| | | | | 248/206.2 |
| 2012/0112023 | A1 * | 5/2012 | Tollman .............. | F16B 47/00 |
| | | | | 248/205.7 |
| 2015/0369276 | A1 * | 12/2015 | Balmer ............... | F16B 47/00 |
| | | | | 248/205.8 |
| 2017/0130763 | A1 * | 5/2017 | Lech .................... | F16B 47/00 |
| 2018/0363844 | A1 * | 12/2018 | Liu ...................... | F16M 13/022 |

* cited by examiner

*Primary Examiner* — Muhammad Ijaz
(74) *Attorney, Agent, or Firm* — Tumey L.L.P.

(57) ABSTRACT

Disclosed is a rotary suction cup, comprising a knob, a base, and a rubber bottom arranged from top to bottom, wherein the knob is connected with the rubber bottom, and the base is provided with a connecting portion for connecting a hanging object, and a through hole; the rotary suction cup further comprising: a pivot seat, arranged in the middle of the rubber bottom, and connected with the knob; a pivot tube, arranged in the knob, and sleeved on and moveably connected to the pivot seat; wherein, the pivot seat is axially moved along with the rotation of the pivot tube, the rubber bottom is concavely deformed on a surface thereof by the pivot seat, and the pivot tube or the knob is rotationally connected to the base in a stepped manner of at least two steps.

12 Claims, 4 Drawing Sheets

ROTARY SUCTION CUP

TECHNICAL FIELD

The invention relates to a rotary suction cup.

BACKGROUND OF THE INVENTION

At present, all suction cups on the market are of a structure with unadjustable suction force. For example, it is common to pull the handle at the center of a rubber bottom base backwards, so that a suction effect is generated between the suction cup and the suction surface. When installing a suction cup which requires to be additionally connected to the matched wire or other products, such suction cup is required to be connected to the corresponding product first and then fastened together therewith on a wall by suction. Operation of such a suction cup is often carried out repeatedly due to inaccurate alignment. Moreover, it is difficult to install the product to be connected due to its weight and volume, or it may require two people to work together. Also, the repeated operation requires the entire suction cup to be disassembled for re-installation every time. As a result, the operation is very inconvenient.

SUMMARY OF THE INVENTION

In order to overcome the shortcomings of the prior art, the invention aims to provide a rotary suction cup with multi-level suction forces, easy position adjustment for installation or connection with accessories in use, and simple and convenient operation.

According to the invention, the rotary suction cup comprises a knob, a base, and a rubber bottom from top to bottom, and the base is provided with a connecting portion for a hanging object, and a through hole. The rotary suction cup further comprises a pivot seat, arranged in the middle of the rubber bottom, and connected with the knob; a pivot tube, arranged in the knob, and sleeved on and moveably connected to the pivot seat; wherein, the pivot seat is axially moved along with the rotation of the pivot tube. Therefore the rubber bottom is concavely deformed on a surface, and the pivot tube or the knob is connected to the base with at least two-level rotation.

Further, the pivot seat on a circumferential wall is provided with a pit slot extending spirally, correspondingly the pivot tube is provided with a knurl which can be clamped in the pit slot in a sliding manner; the surface of the base rotationally abuts against the flange of the pivot tube outer wall or against the knob; the base is provided with at least three notches distributed around an axis of the pivot tube, and correspondingly the knob is provided with a limiting bulge matched with the notches.

Further, the pivot seat, on an edge of the top thereof, on an upper end of the pit slot, is provided with a notch, the bottom surface of the notch is higher than that of the pit slot, the pivot tube is provided with a broken pinch plate on a side wall thereof at the knurl, and one side of a tail end of the knurl, opposite the notch, is formed as a bevel.

Further, the pivot tube on an outer wall thereof, and the knob on an inner sidewall thereof, are respectively provided with outer reverse buckles and inner reverse buckles which are fastened to each other.

Further, the rubber bottom is provided with rubber bottom side walls vertically protruding on edges, correspondingly the base on inner sides thereof is provided with clamping slots in which the rubber bottom side walls are clamped, and a baffle protruding and abutting against the rubber bottom.

Further, the base is provided with a baffle protruding to the rubber bottom, on inner sides thereof.

Further, the knob has an eccentrically arranged rotation center, and the knob is rotated on right side to cover or close the connecting portion.

Further, the connecting portion is designed as a straight or curved groove.

Further, the connecting portion is provided with slightly convex portions on inner side faces of the groove.

The rotary suction cup provides at least two levels of suction adjustment. Specifically, the position of the suction cup may be easily adjusted on a surface while the suction cup is in first level with small suction force, and after an item is attached, the suction cup can be turned into the next level for the maximum suction. The operation is very convenient.

BRIEF DESCRIPTION OF THE DRAWINGS

The invention will be further described by embodiments with reference to the accompanying drawings, wherein.

DETAILED DESCRIPTION OF THE INVENTION

Figure 1:
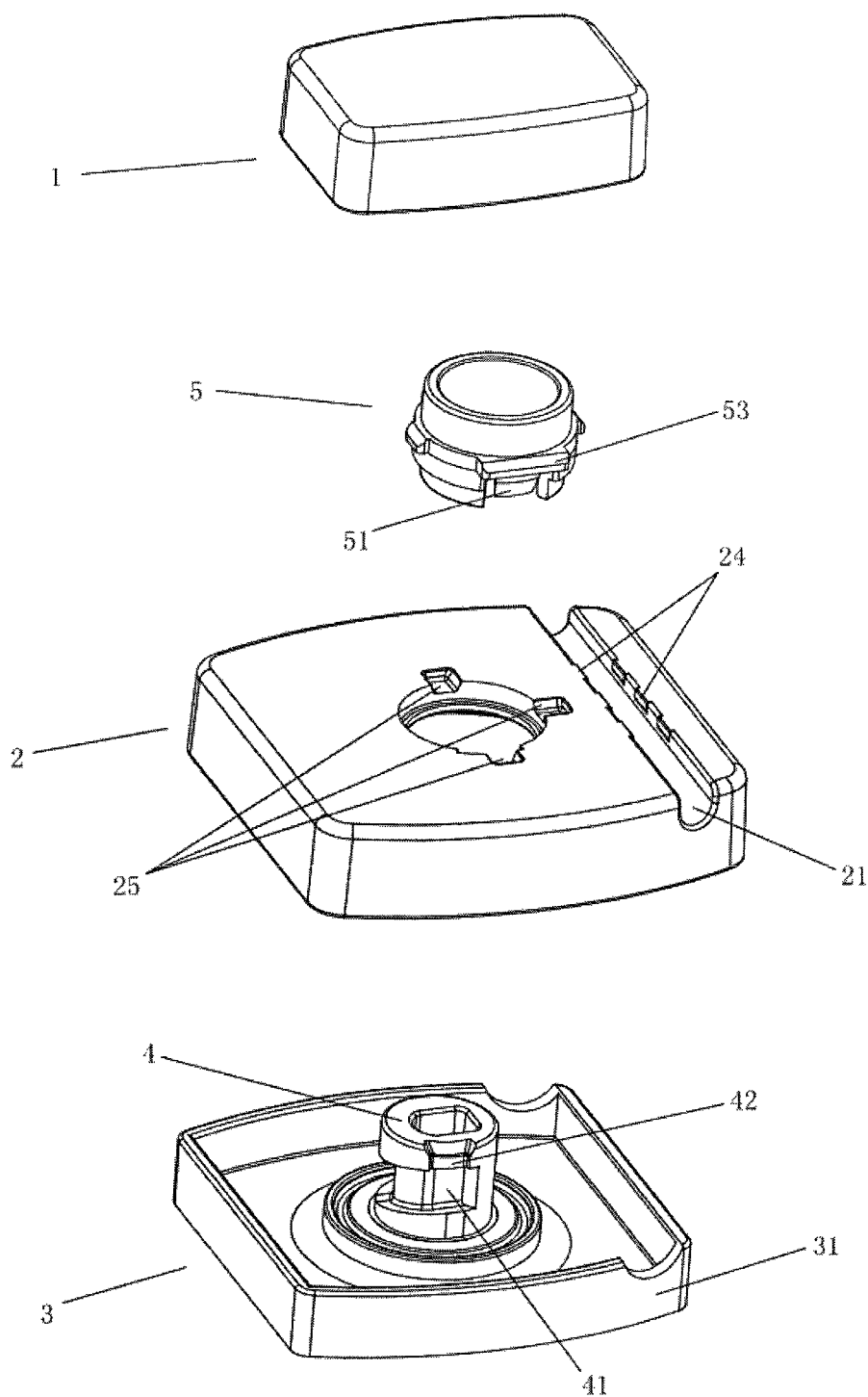
FIG. 1 is an exploded view of a rotary suction cup of the invention.

With reference to FIG. 1, according to the invention, a rotary suction cup comprises a knob 1, a base 2 and a rubber bottom 3 arranged from top to bottom. The base 2 is connected to the rubber bottom 3. The rotary suction cup further comprises a pivot seat 4 arranged in the middle of the rubber bottom 3and connected to the knob 1, and the base 2 is provided with a through hole allowing the pivot seat 4 to extend there through. The base 2 has a connecting portion 21 for connecting a hanging object. The rotary suction cup further comprises a pivot tube 5 arranged in the knob 1, which is matched with and sleeved on the pivot seat 4. The pivot tube 5 and the pivot seat 4 are moveably connected. The pivot seat 4 is moved axially along with the pivot tube 5. And driven by a lower end of the pivot seat 4, the rubber bottom 3 is concavely deformed on a surface thereof. The pivot tube 5 or the knob 1 is rotationally connected to the base in a position-limiting manner with at least two steps.

The pivot seat 4 and the pivot tube 5 may be connected with each other by screw threads respectively formed on a circumferential wall surface of pivot seat 4 and an inner connection surface of the pivot tube 5. Alternatively, the pivot seat 4 and the pivot tube 5 may be in clearance fit with each other by a spiral neck or ditch and a stopper which are matched with each other. So that the pivot seat 4 can be moved axially along with the rotation of the knob 1 through the pivot tube 5. With the clamping structure of the pivot seat 4 or the base 2 and the limiting structure, the knob 1 can be rotated at least two positions from the initial position. Specifically, in use of the suction cup, the knob 1 can be rotated from the initial position into a first position (step 1)

for a first level of suction, where the position of the suction cup on a surface can be adjusted to hang an object to the connecting portion 21 as the suction force is relatively small. After that, the knob 1 can be rotated into a second position (step 2) for a second level of suction, i.e., the maximum suction force of the suction cup, so that the suction cup can tightly attach on the surface to bear the load. The knob 1 and the pivot tube 5 may be of an integral structure or a split structure, and similarly, the rubber bottom 3 and the pivot seat 4 may also be of an integral structure or a split structure.

Figure 2:
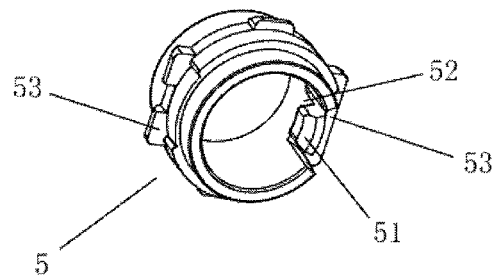
FIG. 2 is a schematic view of a pivot tube of the invention.
Figure 3:
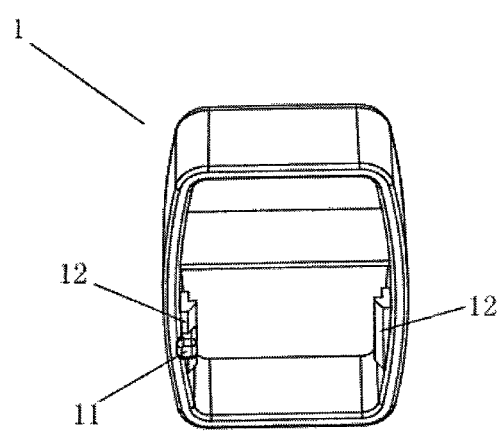
FIG. 3 is a schematic view of a knob of the invention.

As shown in FIGS. 1 to 3, the pivot seat 4 is provided with a pit slot 41 extending spirally on the circumferential wall, and correspondingly the pivot tube 5 is provided with a knurl 51 which is clamped in the pit slot 41 in a sliding manner while the pivot tube 5 is sleeved into the pivot seat 4. The surface of base 2 rotationally abuts against a flange of an outer wall of the pivot tube 5 or the knob 1. The base 2 is provided with at least three notches 25 distributed around an axis of the pivot seat 4, which can achieve to a position-limiting rotation, and correspondingly the knob 1 is provided with a limiting bulge 11 engaged in the notches 25. Once the limiting bulge 11 is engaged in the notches 25, the knob 1 can be positioned in at least three rotation positions along the travel of the knob 1, while forcing the pivot seat 4 to move along its axial direction via the pivot tube 5: a first position, where the knob 1 is positioned in the first notch 25,the pivot seat 4 is not moved yet (in a initial position), and thus there is no concave deformation on the surface of the rubber bottom 3 and no suction generated; a second position, where the knob 1 is rotated into a next notch 25, the pivot seat 4 is moved up to a first level, and a first-level concave deformation is formed on the surface of the rubber bottom 3 and thus the first-level suction is generated. By analogy, the knob 1 is rotated into a next position, the pivot seat 4 is moved up further, the concave deformation is larger, and thus the suction force caused by the concave deformation is further increased accordingly. Specifically, while the knob 1 is forced to rotate, the limiting bulge 11 is forced to deviate from the notches 25 through immediate elastic deformation between each other.

As shown in FIGS. 1 and 2, the pivot seat 4 is provided with a notch 42 on an edge, at the upper end of the pit slot 41, of which a bottom surface is higher than that of the pit slot 41.The pivot tube 5 is provided with a broken pinch plate 52 on a side wall of the knurl 51, and the corresponding end of the knurl 51and the notch 42 is formed as a bevel. In installation, the pivot tube 5 is aligned with the notch 42 of the pivot tube 5 through the knurl 51, and the pivot tube 5 is sleeved on the pivot seat 4 in the axial direction. The bevel reduces the resistance and forces the pinch plate 52 to elastically deform slightly and outwardly, allowing the knurl 51 to pass through the notch 42 and slip into the pit slot 41.

As shown in FIGS. 2 and 3, the pivot tube 5 and the knob 1 are provided with outer reverse buckles 53 and inner reverse buckles 12 which are matched with and fastened to each other, on the outer wall of the pivot tube 5 and the inner side wall of the knob 1 respectively. Preferably the outer reverse buckles 53 and the inner reverse buckles 12 are arranged on two symmetrical sides of the pivot tube 5. The limit bulge 11 is located in the middle of one of the inner reverse buckles 12, and one of the outer reverse buckles 53 is provided with a matched notch for receiving the limit bulge 11. The limiting bulge 11 is positioned into the notches 25 and used as the stopper, working with the outer reverse buckle 53 axially for better rotation. The pivot tube 5 is cylindrical, and it provides a flange with an outer diameter greater than the through hole of the base 2, which abuts against the surface of the base 2.

Figure 4:
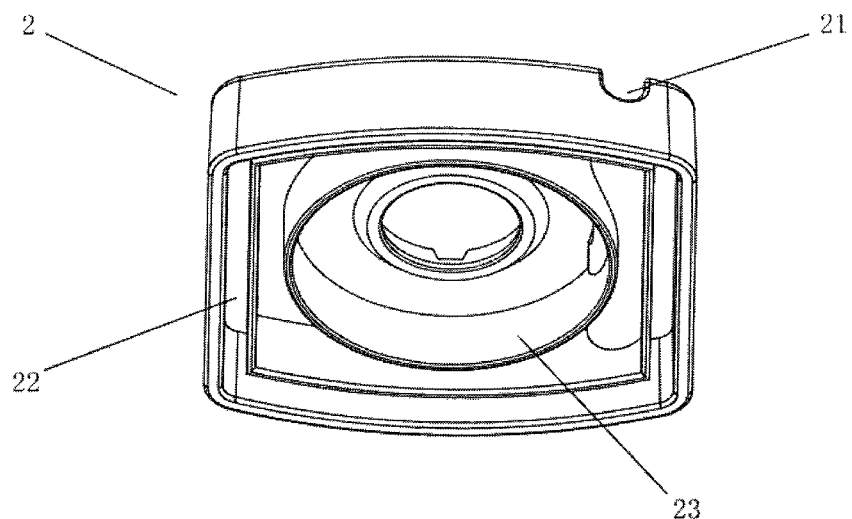
FIG. 4 is a schematic view of a base of the invention.

As shown in FIGS. 1 and 4, the rubber bottom 3 has rubber bottom side walls 31 vertically protruding on edges thereof, and correspondingly the base 2 on inner sides thereof is provided with clamping slots 22 engaging with the rubber bottom side walls 31in a clamping manner. The base 2 on the inner sides thereof is further provided with a baffle 23 protruding to and abutting against the rubber bottom 3. The rubber bottom side walls 31 extend into the clamping slots 22 so that the rubber bottom 3 can better support the base 2 in use. The rubber bottom side walls 31 and the clamping slots 22 may be formed in circles, rectangles, triangles or other shapes.

As shown in FIG. 4, the baffle 23 which protrudes to and abuts against the rubber bottom 3 is formed on the inner side of the base 2, and there is no doubt that the baffle 23 should be arranged around the circumferential wall of the pivot seat 4, to ensure that only the portion of the rubber bottom 3 where the pivot seat 4 is located is allowed to deform concavely to generate negative pressure, and to maintain the contacting area between the rubber bottom 3 and a suction surface under the atmospheric pressure.

As shown in FIGS. 1, 3, 5 and 6, the knob 1 is configured to have an eccentrically arranged rotation center, and the knob 1, with one side thereof, may rotate to cover or close the connecting portion 21. The connecting portion 21 may be designed as a hook, a support plate, a jack or other structures, and correspondingly the side of the knob 1 may be designed to close the opening of the hook, or designed as a corresponding shape for covering the support plate and the jack.

As shown in FIG. 1, the connecting portion 21 is designed as a groove formed on the surface of the base 2, the groove is straight or curved and used for hooking a wire item, such as a square shelf and a towel rack. Correspondingly, the rubber bottom 3 is further provided with a recess on the rubber bottom side walls 31 at the position corresponding to the groove.

The base 2 is further provided with slightly convex portions 24 on inner side faces of the groove. The clamping opening of the groove is narrowed by the slightly convex portions 24 to enhance the stability of the groove to tightly clamp the wire item or others.

Figure 5:
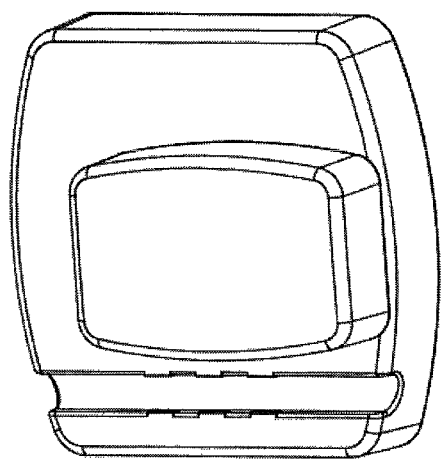
FIG. 5 is a schematic view of the rotary suction cup with the knob rotated to first-level suction, according to the invention.
Figure 6:
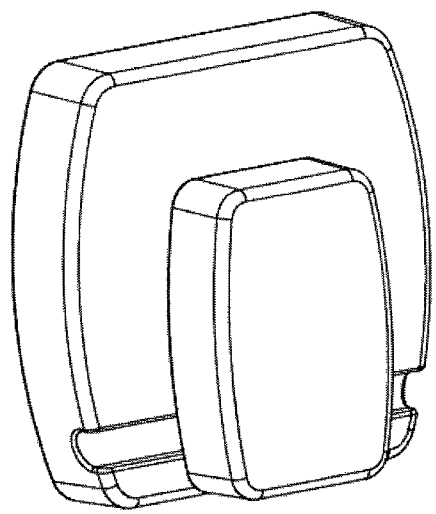
FIG. 6 is a schematic view of the rotary suction cup with the knob rotated to second-level suction, according to the invention.

In FIGS. 5 and 6 a suction cup of a preferred embodiment of the invention is illustrated. The rotation of the knob 1 can provide two levels of suction force, and the knob 1 can cover the connecting portion 21 while rotated into the potion for the maximum suction. In addition, the pivot seat 4 and the rubber bottom 3 may be assembled into an integral structure which cannot be dissembled.

Those described above are merely preferred embodiments of the invention, but the invention is not limited to these embodiments. All embodiments achieving the technical effects of the invention by any identical or similar means shall fall within the protection scope of the invention.

The invention claimed is:

1. A rotary suction cup, comprising a knob, a base, and a rubber bottom, wherein the knob is connected with the rubber bottom, and the base is provided with a connecting portion for connecting a hanging object, wherein the base comprises a through hole;

the rotary suction cup further comprising:
a pivot seat, arranged in the middle of the rubber bottom, and connected with the knob;
a pivot tube, arranged in the knob, and sleeved on and moveably connected to the pivot seat;

where in, the pivot seat is axially moved along with the rotation of the pivot tube, the rubber bottom is concavely deformed on a surface thereof by the pivot seat, and the pivot tube or the knob is rotationally connected with the base in a stepped manner to rotate to at least a first position and a second position, wherein the pivot seat on a circumferential wall thereof is provided with a pit slot extending spirally, correspondingly the pivot tube is provided with a knurl thereon which is clamped in the pit slot in a sliding manner; the base, by a surface thereof, rotationally abuts against a flange on an outer wall of the pivot tube or against the knob; the base is provided with at least three notches distributed around an axis of the pivot seat, and correspondingly the knob is provided with a limiting bulge matched with the notches.

2. The rotary suction cup according to claim 1, wherein the pivot seat, on a top edge thereof, at an upper end of the pit slot, is provided with a notch, a bottom surface of the notch is higher than that of the pit slot, the pivot tube is provided with a broken pinch plate on a side wall thereof at the knurl, and one side of a tail end of the knurl, opposite the notch, is formed as a bevel.

3. The rotary suction cup according to claim 1, wherein the rubber bottom is provided with rubber bottom side walls vertically protruding on edges thereof, and correspondingly, the base on inner sides thereof is provided with clamping slots in which the rubber bottom side walls are clamped, and a baffle protruding and abutting against the rubber bottom.

4. The rotary suction cup according to claim 1, wherein the base is provided with a baffle protruding to the rubber bottom, on inner sides thereof.

5. A rotary suction cup, comprising a knob, a base, and a rubber bottom, wherein the knob is connected with the rubber bottom, and the base is provided with a connecting portion for connecting a hanging object, wherein the base comprises a through hole;

the rotary suction cup further comprising:
a pivot seat, arranged in the middle of the rubber bottom, and connected with the knob;
a pivot tube, arranged in the knob, and sleeved on and moveably connected to the pivot seat;
where in, the pivot seat is axially moved along with the rotation of the pivot tube, the rubber bottom is concavely deformed on a surface thereof by the pivot seat, and the pivot tube or the knob is rotationally connected with the base in a stepped manner to rotate to at least a first position and a second position, wherein the pivot tube on an outer wall thereof, and the knob on an inner sidewall thereof, is respectively provided with outer reverse buckles and inner reverse buckles which are fastened to each other.

6. The rotary suction cup according to claim 5, wherein the rubber bottom is provided with rubber bottom side walls vertically protruding on edges thereof, and correspondingly, the base on inner sides thereof is provided with clamping slots in which the rubber bottom side walls are clamped, and a baffle protruding and abutting against the rubber bottom.

7. The rotary suction cup according to claim 6, wherein the connecting portion is designed as a straight or curved groove.

8. The rotary suction cup according to claim 7, wherein the connecting portion is provided with slightly convex portions on inner side faces of the groove.

9. The rotary suction cup according to claim 5, wherein the base is provided with a baffle protruding to the rubber bottom, on inner sides thereof.

10. A rotary suction cup, comprising a knob, a base, and a rubber bottom, wherein the knob is connected with the rubber bottom, and the base is provided with a connecting portion for connecting a hanging object, wherein the base comprises a through hole;

the rotary suction cup further comprising:
a pivot seat, arranged in the middle of the rubber bottom, and connected with the knob;
a pivot tube, arranged in the knob, and sleeved on and moveably connected to the pivot seat;
where in, the pivot seat is axially moved along with the rotation of the pivot tube, the rubber bottom is concavely deformed on a surface thereof by the pivot seat, and the pivot tube or the knob is rotationally connected with the base in a stepped manner to rotate to at least a first position and a second position, wherein the knob has an eccentrically arranged rotation center, and the knob is rotated with one side thereof to cover or close the connecting portion.

11. The rotary suction cup according to claim 10, wherein the rubber bottom is provided with rubber bottom side walls vertically protruding on edges thereof, and correspondingly, the base on inner sides thereof is provided with clamping slots in which the rubber bottom side walls are clamped, and a baffle protruding and abutting against the rubber bottom.

12. The rotary suction cup according to claim 10, wherein the base is provided with a baffle protruding to the rubber bottom, on inner sides thereof.

* * * * *